(12) United States Patent
McGrath

(10) Patent No.: US 7,396,892 B2
(45) Date of Patent: *Jul. 8, 2008

(54) PROCESS FOR REMOVAL OF INTERMEDIATE HYDROGEN FROM CASCADED POLYOLEFIN SLURRY REACTORS

(75) Inventor: Patrick J. McGrath, Houston, TX (US)

(73) Assignee: Equistar Chemicals L.P., Houston, TX (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/145,260

(22) Filed: Jun. 3, 2005

(65) Prior Publication Data

US 2005/0234203 A1    Oct. 20, 2005

Related U.S. Application Data

(62) Division of application No. 10/116,404, filed on Apr. 4, 2002, now Pat. No. 6,924,340.

(51) Int. Cl.
  *C08F 210/00*  (2006.01)
  *C08F 2/38*  (2006.01)
  *C08F 2/14*  (2006.01)

(52) U.S. Cl. .............. 526/348; 526/65; 526/348.2; 526/348.5; 526/348.6; 526/905

(58) Field of Classification Search ........... 526/65, 526/348, 905, 348.2, 348.5, 348.6
See application file for complete search history.

(56) References Cited

U.S. PATENT DOCUMENTS

| | | | |
|---|---|---|---|
| 2,885,389 A | 5/1959 | Schappert | |
| 2,918,460 A | 12/1959 | Schappert | |
| 3,126,365 A | 3/1964 | Hooker | |
| 4,352,915 A | 10/1982 | Mashita et al. | |
| 4,357,448 A | 11/1982 | Tsubaki et al. | |
| 5,639,834 A | 6/1997 | Debras et al. | |
| 6,072,014 A | 6/2000 | Wilson, Jr. | |
| 6,221,982 B1 | 4/2001 | Debras et al. | |
| 6,225,421 B1 | 5/2001 | Promel et al. | |
| 6,291,601 B1 | 9/2001 | Debras | |
| 6,355,741 B1 | 3/2002 | Marechal | |

FOREIGN PATENT DOCUMENTS

| | | |
|---|---|---|
| EP | 0 057 420 | 2/1982 |
| GB | 826562 | 6/1955 |
| WO | WO 95/10548 | 4/1995 |
| WO | WO 98/58001 | 12/1998 |

OTHER PUBLICATIONS

U.S. Appl. No. 10/396,900, filed Mar. 25, 2003, Mutchler, Joel.

*Primary Examiner*—Fred M Teskin
(74) *Attorney, Agent, or Firm*—Brooks Kushman P.C.

(57) ABSTRACT

Multimodal polyolefin polymers may be prepared in series-connected polymerization reactors where a prior reactor is a slurry reactor employing light solvent as the slurry medium and hydrogen to limit polymer molecular weight, the polymer product from the prior reactor being substantially freed of hydrogen prior to entry into a subsequent polymerization reactor operating at low hydrogen pressure to produce a high molecular weight olefin. The economics and operating performance of such a series slurry reactor polyethylene process can be significantly improved through the use of an intermediate slurry transfer system and hydrogen removal apparatus that employs flash drums in series in conjunction with a warm recycle solvent slurry diluent.

11 Claims, 1 Drawing Sheet

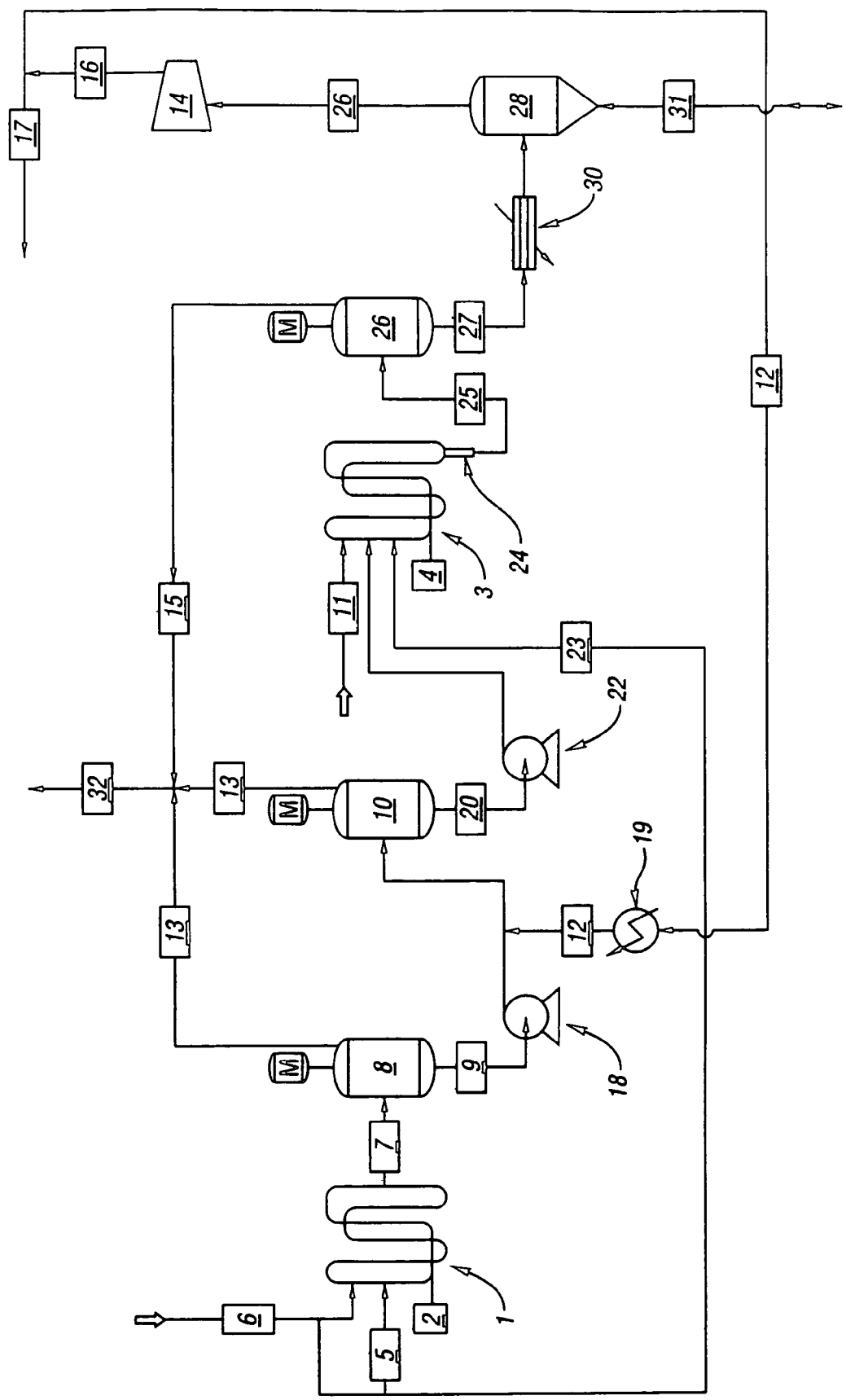

PROCESS FOR REMOVAL OF INTERMEDIATE HYDROGEN FROM CASCADED POLYOLEFIN SLURRY REACTORS

CROSS-REFERENCE TO RELATED APPLICATIONS

This application is a division of and claims the benefit of U.S. application Ser. No. 10/116,404 filed Apr. 4, 2002 now U.S. Pat. No. 6,924,340.

BACKGROUND OF THE INVENTION

1. Field of the Invention

The present invention pertains to the field of olefin polymerization in slurry reactors. More particularly, the present invention pertains to a process for transferring a polyolefin/hydrocarbon solvent slurry from a first, hydrogen rich slurry reactor to a second reactor operated with a low and carefully controlled hydrogen concentration with concomitant removal of hydrogen from the first reactor discharge slurry stream. Within the context of the present invention, hydrogen refers to diatomic hydrogen.

2. Background Art

Polyolefins, particularly polyethylene and polypropylene, are produced in large amounts worldwide by polymerization of olefin monomers. The polyolefin products are employed in numerous products produced by a variety of fabrication processes, including, inter alia, extrusion, injection molding, resin transfer molding, blow molding, roto molding, and the like. Both the ultimate product physico-chemical requirements as well as the various fabrication processes dictate that numerous types of polyolefin resins exist. Thus, homo-, co-, and terpolyolefins are common, in various molecular weight grades. In addition, these polyolefins are frequently compounded, not only with other polyolefins having different physicochemical properties, but also additives such as plasticizers, impact modifiers, antioxidants, flame retardants, UV stabilizers, dyes, pigments, fillers and the like.

Three major types of polyolefin polymerization are known: solution, slurry, and gas phase. Each type has numerous variants. Gas phase and slurry processes are well suited for preparation polyethylene polymers of a wide range of densities, and provide a high percentage of polyethylene currently produced. Slurry reactors, as described in greater detail hereafter, employ a hydrocarbon "solvent" as a slurry medium in which the polyolefin product is substantially insoluble. While solution processes may utilize soluble catalysts, gas phase and slurry reactors generally require supported catalysts where the catalyst is present, at times in the presence of supported cocatalysts or "activators," on an inert support such as finely divided silica.

Conventional polyolefin polymerization generally produces polyolefins with a substantially monomodal molecular weight distribution, which may be narrow, intermediate, or broad. The molecular weight distribution for monomodal polymer populations is generally reported as the polydispersity, $M_w/M_n$, where $M_w$ is the weight average molecular weight and $M_n$ is the number average molecular weight. The polydispersity of polyolefin polymers ranges upwards from above the theoretical minimum of 2.0 for catalytic synthyses processes to as much as 100 or more.

Multimodal resins have more than one significant population of molecular weights. The molecular weight distribution can best be visualized by viewing a gel permeation chromatography plot of the resin. Multimodal populations of molecules will exhibit two or more rather well defined peaks. The terms "bimodal" and "multimodal" are well known to those skilled in the art. The term "multimodal" as used herein includes bimodal resins. Polyolefins with a multimodal molecular weight distribution, preferably an essentially bimodal molecular weight distribution, have great value for certain products and processes.

Multimodal resins may be prepared by physical blending two or more resins having different molecular weight distributions. One disadvantage of such blended resins is that blending constitutes an additional process step. Moreover, the blending must be performed in such a way that a homogenous product is obtained. The blending operation not only adds additional cost to the resin, but moreover, the multimodal resins produced by blending have generally inferior physicochemical properties as compared to multimodal resins having been produced by "in situ" routes.

Preparation of polymer blends in situ avoids physical blending and its disadvantages. Four types of in situ multimodal polymer production may be conceptualized. In a first process, a single reactor is employed with two distinctly different catalysts, each catalyst prepared separately on its respective support. One catalyst is selected to provide a higher molecular weight product than the other catalyst. In such a process, two distinctly different polymers are created, and the product is distinctly heterogenous. Such products are generally inferior in their processing properties, especially for applications such as film production.

In a second process, a single reactor is again used, but two different catalysts are contained on the same support, i.e., so-called "dual site" catalysts. As a result, two different polymers grow from the same catalyst particle. The resultant polymer may be described as "interstitially mixed." A much greater degree of homogeneity in the polymer product is thus obtained at the expense of more complex catalyst preparation. Although this process offers advantages in capial and installed costs relative to multi-reactor processes, the design and synthesis of dual site catalysts is difficult. An additional process disadvantage is that use of a single reactor reduces the number of process parameters that can be manipulated to control polymer properties.

In a third process, cascaded reactors are employed, and additional catalyst is added to the second reactor. The polymer particles from the first reactor continue growth in the second reactor, although at a slower rate. However, new polymer growth begins on the newly added catalyst. Hence, as with the first process described, a heterogenous polymer product is obtained, with the same deficiencies as described previously for such products.

In a fourth process, cascaded reactors are again employed, but catalyst is added only to the first reactor. The supported catalyst associated with the first reactor polymer contain further active sites which initiate polymerization in the second reactor. The second reactor polymerization parameters are adjusted to establish a different polymerization rate and/or molecular weight range as compared to the first reactor. As a result, an interstitially mixed polymer is obtained.

EP-A-0057420 represents an example of a cascaded slurry process wherein catalyst is introduced only into the first reactor. However, molecular weight is regulated by the presence of hydrogen in both reactors, with the second reactor having higher hydrogen concentration than the first reactor, thus limiting the types of interstitially mixed polymers which may be produced. Polymerization at lower hydrogen pressure in the second reactor is not possible. In addition, the polymer formed in each reactor is limited to a specific weight percentage range relative to the weight of the final product.

U.S. Pat. No. 5,639,834 (WO 95/11930) and WO 95/10548 disclose use of cascaded slurry reactors in which the catalyst feed is also limited to the first reactor. In both references, the first reactor polymerization is conducted at very low hydrogen concentration, and all olefin comonomer is incorporated therein. The second polymerization is conducted at high hydrogen concentration with no comonomer feed. U.S. Pat. No. 5,639,834 additionally requires that the takeoff from the first reactor be by way of a settling leg. Continuous takeoff is said to produce inferior products. These processes do not allow operation of the second reactor at lower hydrogen concentration than the first reactor. Moreover, limiting olefin comonomer incorporation to only the first reactor limits the types of polymers which may be produced.

WO 98/58001 discloses that significant advantages in polymer properties are achievable by conducting a two-stage polymerization, the first stage at high hydrogen concentration and low comonomer concentration and the second stage at low hydrogen concentration and high comonomer incorporation. The reactor may be a single reactor or a cascaded reactor system, the latter being preferred. A single catalyst, introduced into the first reactor, may be used. Lower hydrogen concentration in the second stage is achieved by limiting the choice of catalysts to those which rapidly consume hydrogen. Cessation of hydrogen feed thus causes the hydrogen concentration to fall rapidly between stages. The inability to add significant comonomer to the second stage or to limit comonomer incorporation in the first stage detracts from the ability to produce a wide variety of polymers. Moreover, the catalyst choice is limited to those which consume hydrogen when a single catalyst is used.

U.S. Pat. Nos. 6,221,982 B1 and 6,291,601 B1 disclose cascaded slurry polymerizations where at least two distinct catalysts are employed. In U.S. Pat. No. 6,221,982, a Ziegler-Natta catalyst is employed in the first reactor with high hydrogen concentration and no or low comonomer incorporation. A hydrogen-consuming catalyst with low olefin polymerization efficiency is introduced downstream into the first reactor product stream. As a result, hydrogen is consumed prior to reaching the second reactor, wherein the polymerization is conducted at substantially zero hydrogen concentration. The second stage employs significant olefin comonomer. U.S. Pat. No. 6,291,601 is similar, but employs a metallocene catalyst in the first reactor.

Both the U.S. Pat. Nos. 6,221,982 and 6,291,601 processes as well as the process of WO 98/58001 are inefficient in both monomer usage and thermal loading, since the hydrogenation reaction consumes ethylene, producing ethane by hydrogenation. In addition to the increased thermal loading created by this reaction, the ethane produced is an inert gas which must be purged from the system. Moreover, in the U.S. Pat. Nos. 6,221,982 and 6,291,601 processes, an additional relatively expensive hydrogenation catalyst which contributes little to polymer production must be added. Finally, all three processes require substantially homopolymerization in at least the first reactor, thus limiting the types of polymers which may be produced.

It would be desirable to use series-configured slurry reactors wherein hydrogen is introduced into a first slurry reactor to produce a low molecular weight first polymer, following which this first polymer then introduced into a second reactor operated at lower hydrogen concentration, without the requirement of employing a catalyst which specifically encourages hydrogenation. The higher molecular weight polymer produced in the second reactor will be interstitially mixed with previously produced low molecular weight polymer particles which still contain active catalyst. In general, the mass flow of hydrogen contained in the slurry polymer entering the second reactor must be lower by a factor of at least 50, preferably at least 100, from the mass flow of fresh hydrogen to the second reactor, otherwise control of polymer product melt flow index becomes difficult. To effectuate such a process, therefore, hydrogen introduced in the first slurry reactor must be efficiently removed from the first reactor product stream, as the hydrogen concentration in the second reactor will be far lower. In the case of high boiling solvent slurry media such as hexane, removal of hydrogen is relatively straightforward, typically being accomplished with a single stage flash. However, in the case of low boiling solvents such as propane, butane, and isobutane, efficient separation of hydrogen is difficult.

U.S. Pat. No. 6,225,421 B1 discloses use of cascaded reactors wherein ethylene is homopolymerized in the presence of hydrogen in a first reactor, hydrogen is physically separated from the first reactor product stream, and the product is copolymerized with 1-hexene and additional ethylene at reduced hydrogen concentration in the second reactor. However, the patent contains no disclosure of any apparatus suitable for removing hydrogen from the first reactor product stream. Moreover, the necessity to restrict the first polymerization to homopolymerization is limiting.

It would be desirable to provide a cost-effective apparatus suitable for removing hydrogen from the product stream of a first reactor operating at higher hydrogen concentration than a second reactor in series with the first. Use of such an apparatus in a cascaded slurry polymerization process would enable employing a light solvent, hydrogen-mediated slurry reactor in series with a second slurry reactor to produce a multimodal polyolefin polymer without reacting away hydrogen through the use of hydrogen-consuming polymerization catalysts or separate hydrogenation catalysts. It would further be desirable to provide a hydrogen removal process which can accommodate comonomer incorporation in any reactor of the reactor battery.

SUMMARY OF THE INVENTION

These and other objects have been achieved through use of a multiple stage polymerization process wherein in a first stage, a hydrogen-mediated, light solvent slurry polymerization is employed to produce a slurry of a polymer of a given molecular weight, hydrogen is substantially removed from a product slurry stream without separating all the light solvent to produce a substantially hydrogen-free and pumpable slurry, and this slurry is then introduced into a second slurry reactor employing a lower concentration of hydrogen than the prior reactor. The removal of hydrogen between the two series-connected reactors is achieved through the use of multistage flash drums between prior and subsequent reactors, warm light solvent slurry medium from another portion of the process being added to dilute high solids effluent from a first flash drum.

BRIEF DESCRIPTION OF THE DRAWINGS

FIG. 1 illustrates schematically a process for polymerizing olefins employing one embodiment of a hydrogen removal system between cascaded slurry reactors.

DETAILED DESCRIPTION OF THE PREFERRED EMBODIMENTS

Slurry processes for the preparation of polyethylene are well known. One example of a slurry process is the boiling solvent process, or "boiling pool reactor," as disclosed in Great Britain published application 826,562, and U.S. Pat. Nos. 2,885,389; 2,918,460; and 3,126,365, these United States patents incorporated by reference. In this process, a reaction vessel filled with solvent is operated at the boiling point of the solvent. Gaseous olefin, solvent, catalyst, and optionally liquid olefin comonomers are introduced into a continuously stirred trank reactor (CSTR). Since the polymerization process is exothermic, considerable heat must ordinarily be removed. In the case of a boiling solvent reactor, the heat of reaction is removed via the latent heat of vaporization of the solvent. The boiling solvent vapors are subsequently condensed and returned to the reactor. Polymer is harvested from the reactor either intermittently, or continuously as slurry.

A more common slurry polymerization process is the slurry loop process. In this process, the reactor is a tubular loop of carbon steel tubing, located within a larger tube through which water flows to heat or cool the reactor as desired. One or more circulating pumps drive the reactor contents around the loop at relatively high velocity, in order to promote good heat transfer and to minimize reactor fouling. The loops may be oriented horizontally or vertically. Vertical loop reactors have shown advantages in minimizing fouling as compared to horizontal loop reactors.

Product take-off from a loop reactor may be continuous, or via periodically opened settling legs. Both methods have certain advantages, and both are used today. In both cases, solvent slurry medium is removed along with the product, and must be condensed and/or repressurized and reintroduced into the reactor. Slurry loop processes are practiced worldwide by many polyolefin producers, and the details associated with any particular process constitute no part of the present invention. Reference for typical process parameters, product stream flow, energy usage, etc., may be found in PROCESS ECONOMICS PROGRAM REPORTS 185 (polypropylene) and 185A (polyethylene) (2000).

The present invention pertains to the use of at least two slurry reactors in series to produce a polyolefin product where a subsequent slurry reactor employs little or no hydrogen feed compared to the hydrogen feed to the a prior slurry reactor, and to an apparatus suitable for removing hydrogen from the intermediate polymer slurry between the cascaded reactors. Most preferably, two slurry reactors will be employed, although it is also possible to employ three or more reactors in series. It is also possible to employ two or more slurry reactors in series along with one or more slurry reactors operating concurrently in parallel.

Slurry processes employing light solvents exhibit certain advantages over heavier solvent systems. For example, polyolefin oligomers tend to be less soluble, and the solvent is readily and substantially completely removed from the polymer product. However, hydrogen gas must be virtually completely removed between prior and subsequent stages, otherwise process control of the subsequent stage is difficult and high molecular weight may be impossible to attain. Light solvents tend to flash away with the hydrogen. If too much solvent flashes off, solids in the slurry take-off increase to such a high level that it may no longer be pumpable. If solvent flash-off is reduced, hydrogen separation is poor. These constraints, along with a desire to minimize installed and operating costs, have thus far limited the commercial viability of light solvent series slurry reactor technology.

By the term "light solvent" is meant a hydrocarbon solvent with a boiling point less than 25° C. at standard pressure, preferably less than 10° C. at standard pressure, and more preferably less than 0° C. at standard pressure. Preferred light solvents are neopentane (9.5° C.), n-butane (−0.5° C.), i-butane (−11.7° C.), and propane (−42.5° C.). Of these, i-butane and propane are preferred, particularly the former. Although mixtures of solvents may be used, such mixtures are not preferred owing to complexities associated with recovery and recycle.

In the present process, hydrogen removal is accomplished by two flash drums or their substantial equivalents series connected between an outlet of a prior slurry reactor and the inlet of a subsequent slurry reactor, the outlet of the second flash drum constituting the polymer slurry feed to the subsequent reactor. By the term "prior" slurry reactor is meant a slurry reactor preceding a subsequent slurry reactor wherein a lower concentration of hydrogen is employed. By the term "subsequent reactor" is meant a polymerization reactor which employs a lower concentration of hydrogen than the concentration of hydrogen in a prior reactor whose output slurry is processed and ultimately comprises a feed to the subsequent reactor.

In the case of three series-connected reactors, several possibilities for reactor designation as "prior" and "subsequent" exist. The definitions above still apply. For example, in a three slurry reactor, series configured system where hydrogen is present in all three reactors, and the concentration of hydrogen is greatest in the first reactor and least in the third reactor, the first reactor will be a prior reactor, the second reactor will be both a subsequent reactor (the first reactor being prior) and a prior reactor (the third reactor being subsequent). In such a case, the system preferably contains two two-stage or multi-stage flash drum hydrogen removal systems, one between reactors one and two, and one between reactors two and three. However, if the hydrogen concentration differences are compatible with lesser hydrogen concentration reduction between any two prior and subsequent reactors, then a two- or multi-stage flash drum hydrogen removal system may be required between only one pair of reactors, with a single flash drum or no flash drum located between the other pair of prior/subsequent reactors.

In the majority of cases, two reactors will be utilized, the product polymer slurry and a portion of the solvent from the first reactor ultimately comprising a feed to the second reactor. In such a case, the first reactor is the "prior" reactor and the second reactor is the "subsequent" reactor. At least two flash drums in such a case will be located between the first and second reactors. The flash drums may also be designated as "prior" and "subsequent" since it is possible to employ more than only two flash drums.

By "flash drum or its substantial equivalent" is meant a flash drum per se or an arrangement of one or more vessels which together provide the function of a single flash drum. A flash drum is a vessel of generally substantial volume into which, in the context of the present invention, a polymer slurry containing an appreciable content, i.e. 20-60 percent by weight, preferably 25-55 percent by weight, and most preferably 30-45 percent by weight solid polymer particles, the remainder being substantially light solvent, hydrogen, catalyst, etc., is introduced at relatively high pressure, the flash drum being maintained at a considerably lower pressure, such that considerable light solvent, hydrogen, and any other volatile components "flash" away, leaving a polymer-particle enriched and hydrogen-depleted slurry stream.

The flash drum may be generally cylindrical with a modest aspect ratio, i.e. 2:1, or may be spherical, columnar (i.e. an aspect ratio greater than 2:1), or of other shape. The flash drum, regardless of shape, internal configuration, and whether static or assisted by agitation, etc., must function to rapidly and efficiently flash off light solvent and hydrogen, such that the concentration of hydrogen is substantially reduced. The concentration of light solvent will be reduced as well, although preferably not to the same degree. The bottom of the flash drum is preferred to be relatively quiescent relative to the upper portion such that a smooth and relatively consistent outlet flash drum product stream may be obtained.

In the process of the present invention, the input to a first flash drum (or its substantial equivalent, hereafter), will be a polymer particle slurry from a slurry reactor wherein hydrogen is employed to limit molecular weight. In the case of boiling solvent reactors, the slurry may be taken from the bottom of the reactor or from a point or series of points in the vicinity of the bottom of the reactor, or from the side of the reactor below the liquid level, or from a series of points from the side of the reactor below the liquid level, or a combination of points from the side of the reactor below the liquid level and from the bottom of the reactor. In the case of loop reactors, although the product is generally removed from a settling leg when only a single reactor is employed, it is preferable, in the present invention, that the product slurry for eventual input to the subsequent reactor be taken continuously from the reactor, preferably at a solids concentration of greater than 30 weight percent. It is, of course, possible to employ the solids slurry taken from a settling leg, although this is not preferred.

The first flash drum flashes away light solvent and hydrogen, leaving a solids-enriched slurry. The pressure and throughput of the first flash drum are selected so as to provide the desired separation of hydrogen in conjunction with the second or subsequent (in the case of more than two) flash drums. The size, throughput, operating temperature and pressure may be established or approximated by well known modeling software such as Aspen Plush™ with Polymers Plus™, available from Aspen Technologies, Inc. In addition, customized programs may readily be created by those skilled in chemical engineering.

Since considerable light solvent is lost in the first flash drum, it is necessary to add make-up solvent to the first flash drum outlet slurry. For example, the solids content may increase, in the first flash drum, from 45 weight percent to 55 weight percent or more. The "flashing" process also cools the polymer slurry. Introduction of make-up solvent at this point, preferably warm make-up solvent obtained from other portions of the overall polymerization process, maintains pumpability of the slurry, and in the case of warm make-up solvent, renders hydrogen separation in the second or subsequent flash drum more efficient.

If, after the first flash drum, the polymer slurry weight percent solids remains sufficiently low, the addition of make-up solvent may be delayed to a subsequent stage of hydrogen removal if more than two flash drums are used. Make-up solvent must generally be added during hydrogen removal at some stage, otherwise either the slurry will become difficult to pump, or hydrogen removal efficiency will be compromised. Thus, addition of make-up solvent, preferably warm make-up solvent is a necessary feature of the present invention.

The second flash drum removes additional hydrogen and light solvent, and is operated at a lower pressure than the first flash drum. While it is preferable that the outlet of the first flash drum be the immediate input to the second flash drum, and that this arrangement be repeated for any subsequent flash drums, it is also possible to heat the outlet streams from a given flash drum by routing the stream through a heat exchanger, thereby increasing the temperature of the slurry prior to introduction of the slurry into the next flash drum.

Through the use of two or more flash drums in series with addition of make-up solvent, it is possible to reduce hydrogen concentration to very low levels. For a reactor configuration producing 60,000 lbs polymer/hr, the hydrogen contained in the discharge stream from the most subsequent flash drum is preferably less than $1 \times 10^{-4}$ weight percent, more preferably less than $8 \times 10^{-5}$ weight percent, or about 0.05 lb hydrogen/hr. By the term "low concentration of hydrogen" is meant a mass flow of hydrogen in the polymer slurry entering a subsequent reactor which is at most 0.1 of the mass flow of fresh hydrogen feed to the subsequent reactor. Flash drum stages between the prior and immediately subsequent reactors should preferably be capable of lowering the mass flow of slurry hydrogen to fresh hydrogen feed to the subsequent reactor to about 0.02, more preferably 0.01.

Make-up solvent may be added at the discharge of the prior flash drum slurry transfer pump at any point prior to the entry of the subsequent flash drum, or directly to the second flash drum. The solvent added is preferably process derived light solvent, i.e. recycle solvent, although the solvent may also comprise fresh solvent in whole or in part. The solvent is most preferably recycle solvent recovered from the solvent recovery system, specifically from the recycle gas (flash gas) compressor. Make up solvent derived from the recycle gas compressor provides significant heat integration to the process which favorably impact the process economics by reducing both operating costs, i.e. energy consumption, and capital costs, i.e. the size and cost of many of the solvent recovery system equipment components is reduced.

The monomers employed in the process of the present invention may be any conventionally employed in olefin polymerization. Preferred primary monomers include 1-butene, 2-butene, propylene and ethylene, preferably ethylene and propylene, and most preferably, ethylene. Propylene and 1- and 2-butene, and higher olefins may be copolymerized with ethylene to produce a variety of co- and terpolymers, for example, but not by way of limitation, 1-hexene, 2-hexene, cyclohexene, 1-octene, norbornene, cyclopentene, and the like. Preferred comonomers when ethylene is the primary monomer are propylene, 1-butene, 1-hexene, and 1-octene. Mixtures of two or more comonomers may be used as well. When propylene is the primary monomer, suitable comonomers include but are not limited to ethylene, 1-butene, 1-hexene, and 1-octene. Other copolymerizable species such as styrene, p-methylstyrene, acrylates, diolefins, and the like may also be included, but are not preferred. Other suitable monomers include vinyl esters such as vinyl acetate, vinyl octoate, and the like. Most preferably, the primary monomer (>50 mol % in the polymer) is ethylene or propylene, and comonomers are one or more olefins other than the primary monomer.

The reaction is generally catalyzed by transition metal complex catalysts, including the so-called "Ziegler-Natta" catalysts, chrome catalysts, and single site catalysts, for example optionally substituted cyclopentadienyl and other η-bonded titanium, zirconium, and hafnium complexes such as bis(methylcyclopentadienyl) zirconium dichloride and bis(cyclopentadienyl) hafnium dimethyl. Cocatalysts such as non-coordinating bulky anions, metal alkyls, or alumoxanes are often useful and generally required. The catalysts are generally supplied supported on inorganic carriers, preferably silaceous carriers such as silica, although homogenous catalysts may also be useful. All these catalysts as well as other additives such as antifoulants and the like are well known to those skilled in the art of olefin polymerization.

The present invention also pertains to an apparatus suitable for employing intermediate to prior and subsequent slurry polymerization reactors for the purpose of hydrogen removal. Thus, the invention also pertains to a polymer transport apparatus suitable for removing hydrogen between cascaded olefin slurry polymerization reactors, wherein a plurality of flash drums is employed, each flash drum having a polymer slurry inlet, a polymer slurry outlet, and a flash stream outlet, one of the flash drums being "a prior" flush drum whose polymer slurry outlet comprises the polymer slurry inlet of a second, "subsequent" flash drum downstream from the prior flash drum. The prior flash drum is associated with a solvent inlet to either the flash drum per se or to a polymer slurry outlet therefrom. Optionally, the apparatus contains a transfer pump having an inlet downstream from the prior flash drum solvent inlet and an outlet which comprises an inlet to a subsequent flash drum, such that a polymer slurry exiting from the prior flash drum is transferred to the subsequent flash drum. The subsequent flash drum polymer slurry outlet comprises a feed to a subsequent slurry polymerization reactor downstream from the prior slurry polymerization reactor. Optionally, a second transfer pump is employed to transfer polymer slurry from the second flash drum outlet to the subsequent slurry polymerization reactor.

If the pressure differential between the prior flash drum and a subsequent flash drum is sufficiently high and the physical connections between reactors permits, it may not be necessary to employ a transfer pump between the two flash drums. Likewise, if the outlet pressure of the second flash drum is sufficiently high, a transfer pump may not be necessary between the subsequent flash drum polymer slurry outlet and the subsequent slurry reactor.

The second flash drum is generally operated at lower pressure than the first flash drum. However, the polymer slurry pressure may be increased between flash drums, enabling the second flash drum to be operated at the same or even a higher pressure. Lower pressure operation is preferred. The first flash drum is preferably, but not necessarily, maintained at a pressure lower than the prior slurry reactor by about 100 psi or more, preferably 250 psi or more, and the subsequent flash drum is preferably, but not necessarily, maintained at a pressure less than the prior flash drum, preferably more than 40 psi lower, and more preferably about 60-80 psi lower. When more than two flash drums are used, the total pressure drop may be distributed among the plurality of flash drums in any convenient manner so long as the hydrogen mass flow from the last flash drum polymer outlet slurry is less than the mass flow of fresh hydrogen feed to the subsequent slurry reactor by the appropriate margin. This margin has a preferable limit of not more than 0.01 of the ratio of slurry hydrogen mass flow to the subsequent polymerization reactor relative to the fresh hydrogen feed mass flow to this reactor, but is actually governed by the ability to produce a final polymer product with stable physical properties, particularly melt flow index.

The invention may now be described with reference to FIG. 1, a simplified schematic of the slurry portions and flash drum portions of a series cascaded pair of slurry loop reactors. While the design of the flash drum hydrogen removal system will be within the capability of a chemical engineer familiar with hydrocarbon processing and the polyethylene polymerization process, the following is an example of the results of such a design process and the assumptions made for the process. Where notable, additional information will be provided with respect to system design, although all will be apparent to one skilled in the art.

EXAMPLE 1

The example assumes that two vertical slurry loop reactors will be cascaded in series, with a two stage flash drum intermediate hydrogen removal system located between the two reactors. The first reactor in the series is denoted as the "A" reactor, and the second reactor is denoted as the "B" reactor. The loop reactors are tube-within-tube reactors wherein the inner tube, of 24" inside diameter carbon steel, constitutes the polymerization reactor, and the outer tube, nominally 42" inside diameter, defines the coolant capacity between the outer and inner tubes. The reactors are run solvent full, and nominally produce 60,000 lb/hr of a bimodal HDPE containing 1-butene as a comonomer. The 'A' reactor (1) is a 1500 ft, 31,000 gal six-leg reactor with a 2.0-hour residence time. The 'B' reactor (3) is a 2000 ft, 42,000 gal eight-leg reactor with a 1.4-hour residence time. Both reactor jackets are significantly oversized, thus providing the capability for reactor operations at higher reactor wall temperatures and thereby providing some flexibility for avoiding fouling during the synthesis of lower density resins. The slurries are driven around their respective loops by impeller pumps (2) and (4).

Ethylene, 1-butene, hydrogen, and catalyst, along with fresh isobutane solvent, are fed in stream 5 to the 'A' reactor, where solid polyethylene powder is synthesized at a rate of 30M lb/hr. Recycle solvent is fed to the reactor in stream 6. The reactor runs at 180° F., 575 psi, and 40-wt % solids. The 'A' reactor polymer has a number average molecular weight ($M_n$) of approximately 4000 Daltons and a polydispersity index (PDI) of approximately 5. The reactor residence time is approximately 120 minutes, with the catalyst approximately 45% deactivated as it leaves the reactor.

The intermediate hydrogen removal and slurry transfer system consists of two flash drums (8, 10) in series with a warm diluent stream (12) added to the bottoms of the first flash drum (8). Polymer slurry (7) is discharged from the 'A' reactor via one or more product discharge valves on the bottom of the reactor without utilizing a settling leg. It is preferable to maintain slurry concentrations below 45 wt-% in the intermediate transfer system in order to avoid complicating the design of the transfer pumps. This is achieved, in the 'A' reactor, by the absence of a settling leg. Alternatively, the 'A' reactor could be operated at lower solids and a settling leg employed. However, such a process is less economical as polymer throughput is less for a given reactor volume.

The 1st stage intermediate hydrogen removal system flash drum (8) operates at a pressure of approximately 180 psi and a temperature of approximately 162° F. The 1st stage flash bottoms (9) are then mixed with approximately 20,000 lb/hr of the product flash gas compressor (14) discharge (16) A trim heater/cooler (19) adjusts the temperature of the recycle solvent stream (12). This recycle isobutane gas stream serves to dilute the slurry feed to the 2nd stage 'A' reactor flash drum, such that the 2nd stage flash bottoms solids concentration does not exceed the preferable upper limit of 45 wt-%. Additionally, the recycle gas stream warms the slurry stream back up to 180° F. so as to provide increased hydrogen removal efficiency in the 2nd stage flash. Finally, this recycle gas stream also provides heat integration, saving approximately 3 million BTU/hr in cooling water duty. The balance of the recycle gas compressor discharge (17) is routed to solvent separation/recovery. The 1st stage slurry is pumped to the 2nd stage flash drum by pump 18.

The 2nd stage flash drum (10) operates at pressure of 110 psi and a temperature of 140° F. The flash drum bottoms stream (20) contains less than $6.5 \times 10^{-7}$ weight percent $H_2$, or approximately 0.05 lb/hr $H_2$ at a 60M lb/hr PE production rate. In order to maintain precise control of 'B' reactor polymer product melt index (MI), it is preferable that the mass flow of hydrogen from the bottoms of the 2nd stage 'A' reactor flash drum is approximately 100 times less than the mass flow of fresh hydrogen feed to the 'B' reactor. The flash gas (13) from the two intermediate hydrogen removal system flash drums are combined with the flash gas (15) from the first product flash drum (26) and routed (32) to purification and recovery, particularly to recover hydrogen, monomers, and recycle solvent. The intermediate hydrogen removal system flash drums (8, 10) and the first product flash drum (26) are preferably agitated, for example by motors M.

For the reactor configuration herein described, which is exemplary and not limiting, the intermediate hydrogen removal system flash drums (8,10) are sized based on slurry solids, type of light solvent, desired operating temperature and pressure, degree of fill, etc. In the present case, both flash drums are 6'0" inside diameter by 12'0" tall (3300 gal) cylindrical drums assumed to run at 50% fill level with no gas entrainment. Hydrocarbon throughput through the first flash drum (8) is about 2068 ft$^3$/hr, at a 0.083 hr residence time. The necessary volume may be estimated by multiplying the hydrocarbon throughput by the residence time divided by the fill level. The second flash drum is similarly sized, and has an estimated hydrocarbon throughput of 2900 ft$^3$/hr. Note that the hydrocarbon throughput is higher than the first flash drum (8) because an adequate amount of warm recycle solvent is added to the first flash drum outlet stream in order to prevent the second flash drum bottoms from exceeding about 45 weight percent solids.

The 2nd stage intermediate hydrogen removal system flash drum bottoms (approximately 40 weight percent solids) is pressurized by pump (22) and fed to the 'B' reactor, along with recycle isobutane (23), makeup isobutane, ethylene, 1-butene, and a small amount of hydrogen feed (11). The reactor (3) runs at 160° F., 235 psi, and 40 weight percent solids. Approximately 30,000 lb/hr of polymer is synthesized in the 'B' reactor, and thus approximately 60,000 lb/hr of polymer is harvested. The $M_n$ of the polymer synthesized in 'B' reactor is approximately 16,000 Daltons. The composite $M_n$ of the 'B' reactor powder is approximately 10,000 Daltons and is characterized by a large PDI of approximately 25. The molecular weight distribution is bimodal, although the process may be used to produce substantially monomodal polymers with high polydispersities as well. The reactor residence time is approximately 85 minutes. Note that there is no fresh catalyst feed to 'B' reactor; the polymer produced in the 'B' reactor is catalyzed by catalyst carried over from the 'A' reactor. However, in other cases, fresh catalyst of the same or of different type could, of course, be added. Furthermore, because the catalyst entering the 'B' reactor is essentially "embedded" in 'A' reactor powder, the 'B' reactor polymer chains grow in the interstices of the 'A' reactor polymer chains. The interstitial mixing of short and long polymer chains gives a resin with both attractive physical properties (such as tensile strength) and excellent processability. The catalyst is approximately 85 percent deactivated as it leaves the 'B' reactor. Note that both reactors may incorporate comonomers.

It is interesting to note that the product rates of both reactors may be essentially the same, yet the residence time in the 'B' reactor can be less than that of the 'A' reactor despite no fresh catalyst feed to 'B'. This condition is especially interesting in that the reaction driving forces in 'B' reactor are lower than those in 'A' reactor, i.e. 'B' reactor operates at comparable ethylene concentration but lower temperature than the 'A' reactor. This phenomenon is a result of the fact that the catalyst undergoes significant (reversible) site inhibition by hydrogen. As there is significant hydrogen present in the 'A' reactor, forward site inhibition by hydrogen in effect reduces the productivity of the catalyst. However, as the catalyst enters the hydrogen starved 'B' reactor the site-inhibition is reversed, effectively generating new active sites on the catalyst and thus giving the catalyst a significant boost in activity.

Polymer is harvested from the 'B' reactor (3), preferably via a conventional settling leg (24) and a subsequent two-stage flash, consisting of flash drum (26) and second stage flash drum (28), as a polymer powder stream (31). Polymer slurry exits the settling leg (24) at 50 weight percent solids and is flashed at 95 psi and 148° F., such that the 1st stage 'B' reactor flash slurry bottoms (27) are approximately 55 weight percent solids. The concentrated slurry is heated to 190° F. with a pipe-in-pipe exchanger (30) wherein it enters the 2nd stage 'B' reactor flash drum (28). This 2nd stage flash operates at 3 psig, and effectively flashes all free liquid from the polymer powder. Isobutane flashed from the second stage, stream (29), is compressed by compressor (14), optionally purified, and may be reintroduced into the reactor(s) (1, 3) as solvent (17, 6, 23). A portion of the compressor discharge may also serve as make-up solvent input to the intermediate hydrogen removal system (12).

The polymer powder recovered in stream (31) is treated by conventional methods. For example, light hydrocarbons (primarily isobutane) may be stripped from the polymer powder with nitrogen using conventional techniques, and recycled to the reactors. Any recovered light hydrocarbon stream should contain a minimum of nitrogen. The overheads from the reactor flash drums are recovered with conventional means.

It should be noted that the polymer produced in the prior slurry reactor may be a homopolymer or copolymer. Likewise, the polymerization in the subsequent reactor may be a homopolymerization or a copolymerization, the latter with the same comonomer employed in the first reactor (when a copolymer is produced), or with a different comonomer(s). The same catalyst may be employed in both reactors, or different catalysts may be employed. The process is highly flexible.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An interstitially mixed, multimodal polyethylene copolymer containing a low molecular weight portion comprising a copolymer of ethylene and at least one other copolymerizable olefin monomer, and a higher molecular weight portion comprising a polyethylene homo- or copolymer, prepared by the process of
   a) polymerizing at least two olefin monomers in the presence of hydrogen in a prior slurry reactor employing light solvent as a slurry medium to form a first polyolefin polymer of a first molecular weight; and
   b) removing said first polyolefin polymer from said prior slurry reactor as a hydrogen-containing polymer slurry in light solvent and introducing said hydrogen-containing polymer slurry into a subsequent slurry reactor containing ethylene and optionally one or more olefin monomers other than ethylene, and employing a low concentration of hydrogen, polymerizing to form an ethylene homo- or copolymer, and recovering a polyolefin polymer therefrom, wherein the hydrogen concentration in the hydrogen-containing polymer slurry is lower than the hydrogen concentration in said prior slurry reactor, the hydrogen mass flow from the hydrogen-containing polymer slurry fed to the subsequent reactor is less than a fresh hydrogen mass flow feed to the subsequent reactor by a factor of at least 10, and wherein a rapidly hydrogen-consuming catalyst is not employed in said subsequent slurry reactor.

2. The copolymer of claim 1, wherein the olefin comonomer present in said prior slurry reactor is selected from the group consisting of propene, 1-butene, 1-hexene, 1-octene, and mixtures thereof.

3. The copolymer of claim 1, wherein no comonomer is fed to said subsequent slurry reactor other than residual comonomer contained in said polymer slurry from said prior slurry reactor.

4. The copolymer of claim 1, wherein an olefin comonomer is fed to said subsequent slurry reactor, selected from the group consisting of propene, 1-butene, 1-hexene, 1-octene, and mixtures thereof.

5. The copolymer of claim 1, wherein both said low molecular weight portion and said higher molecular weight portion are prepared by copolymerizing ethylene and at least one second comonomer selected from the group consisting of propene, 1-butene, 1-hexene, and 1-octene.

6. The copolymer of claim 1, wherein catalyst is added only to said prior slurry reactor.

7. The copolymer of claim 1, wherein said catalyst is a supported catalyst having deposited thereon a single catalytic species.

8. The copolymer of claim 1, wherein said catalyst is a supported catalyst having two different catalytic species deposited thereon.

9. The copolymer of claim 6, wherein said catalyst is a Ziegler-Natta transition metal catalyst.

10. The copolymer of claim 1, having a polydispersity of about 25.

11. The copolymer of claim 1, wherein hydrogen is substantially removed from said polymer slurry from said prior reactor by a cascade of at least two flash drums between said prior and said subsequent reactor.

* * * * *